United States Patent [19]

Downing et al.

[11] Patent Number: 4,660,152
[45] Date of Patent: Apr. 21, 1987

[54] SYSTEM AND METHOD FOR MONITORING AND MAINTAINING CONCENTRATE MATERIAL IN A FLUID CARRIER

[75] Inventors: Robert A. Downing, San Jose; Lorin K. Hansen, Fremont, both of Calif.

[73] Assignee: Xerox Corporation, Stamford, Conn.

[21] Appl. No.: 621,965

[22] Filed: Jun. 18, 1984

[51] Int. Cl.$^4$ .................... G06G 7/57; G03G 15/00; B67D 5/08

[52] U.S. Cl. .................... 364/509; 355/14 C; 222/DIG. 1; 222/56; 364/552; 364/179

[58] Field of Search .............. 364/178, 179, 176, 496, 364/497, 499, 552, 555, 509, 510, 565; 355/14 C; 222/56, DIG. 1

[56] References Cited

U.S. PATENT DOCUMENTS

| | | | |
|---|---|---|---|
| 3,650,196 | 3/1972 | Hosoe et al. | 95/89 R |
| 3,699,992 | 10/1972 | Knechtel et al. | 137/93 |
| 3,712,203 | 1/1973 | Kishi et al. | 95/89 R |
| 3,910,459 | 10/1975 | Bock et al. | 222/DIG. 1 X |
| 3,926,145 | 12/1975 | Muth | 118/7 |
| 3,992,109 | 11/1976 | Bock | 356/181 |
| 4,032,227 | 6/1977 | Hubbard et al. | 355/14 D X |
| 4,065,031 | 12/1977 | Wiggins et al. | 222/DIG. 1 X |
| 4,077,724 | 3/1978 | Briggs | 356/208 |
| 4,108,545 | 8/1978 | Echert, Jr. et al. | 355/14 D |
| 4,119,989 | 10/1978 | Carvalko et al. | 354/298 |
| 4,124,301 | 11/1978 | Pocock | 356/432 |
| 4,222,497 | 9/1980 | Lloyd et al. | 222/DIG. 1 X |
| 4,260,073 | 4/1981 | Baumann | 222/DIG. 1 X |
| 4,289,092 | 9/1981 | McChesney et al. | 118/660 |
| 4,310,238 | 1/1982 | Mochizuki | 355/14 D |
| 4,326,646 | 4/1982 | Lavery et al. | 222/56 |
| 4,326,940 | 4/1982 | Eckles et al. | 364/497 X |
| 4,357,668 | 11/1982 | Schwartz et al. | 364/497 |
| 4,454,833 | 6/1984 | McChesney et al. | 118/651 |
| 4,462,680 | 7/1984 | Ikeda | 355/14 D |
| 4,502,778 | 3/1985 | Dodge et al. | 355/14 D |
| 4,513,294 | 4/1985 | Anderson et al. | 346/33 ME |
| 4,545,020 | 10/1985 | Brasfield | 364/509 |

Primary Examiner—Felix D. Gruber
Assistant Examiner—Joseph L. Dixon
Attorney, Agent, or Firm—W. Douglas Carothers, Jr.

[57] ABSTRACT

A system is disclosed that monitors the concentration of material in a fluid carrier which includes means for circulating the fluid carrier within a substantially closed loop system and means for measuring the concentration of material carried in the fluid. The measuring means includes means to detect rapid changes in transmissivity of the fluid carrier, which are indicative of the presence of entrained air bubbles in the fluid carrier, so that measurements of material concentrate under such conditions may be ignored or rejected. Further, to ensure that an accurate measurement of concentrated material depletion is being observed, more than one consecutive measurement is made and validated before concentrate is finally added to the fluid carrier in the system. In the preferred embodiment, the determination of whether air bubbles may be entrained in the fluid carrier is accomplished by determining a disparity between two consecutively measured samples to have been greater than a predetermined value. If such a disparity exists, the measurement sampling rate is increased until the disparity between consecutively measured samples is again less than the predetermined value, at which time sampling is again performed at slower sampling rate. If a disparity exists between several consecutive samples and the disparity in each case remains below the predetermined value, the samples so observed are determined as valid and representative of continuous depletion of the concentrate material in the fluid carrier. When several of these consecutive and validated sample values exceeds a predetermined threshold and there has been no interruption in such sampling due to a disparity between samples greater than the predetermined value, an enablement will be provided to permit concentrate material to be added to the fluid carrier. The system of this invention has particular application to the monitoring the level of toner concentrate in a fluid carrier of fluid toner development system in an electrographic printer/plotter system or machine.

13 Claims, 12 Drawing Figures

SYSTEM AND METHOD FOR MONITORING AND MAINTAINING CONCENTRATE MATERIAL IN A FLUID CARRIER

REFERENCE TO CROSS-RELATED APPLICATION

This application is related to Patent Application Ser. No. 621,964 now abandoned filed June 18, 1984, which Application pertains to the flow cell disclosed in this application.

BACKGROUND OF THE INVENTION

This invention relates to a system for automatically monitoring, maintaining and adjusting the concentration of a material carried in a fluid carrier or medium and is particularly useful for monitoring and adjusting toner material suspended in a fluid carrier in the development system of an electrographic printer/plotter.

In the past, a system for monitoring and maintaining the material concentration in a fluid carrier or medium, in particular toner concentrate in a fluid carrier, has been normally carried out by examining the transmissivity of the fluid carrier as it passes into or through a fluid carrier chamber or as it passes through a flow cell. Examples of such systems are disclosed in U.S. Pat. Nos. 3,650,196; 3,699,992; 3,712,203, 3,926,145; 3,992,109; 4,077,724; 4,119,989; 4,124,301; 4,222,497 and 4,310,238. All of the systems disclosed in these patents include some optical or electrical means to sense, detect or measure the transmissivity of the fluid carrier and determine a change in that transmissivity. In many cases the change in transmissivity is compared to some reference, and when appropriate, additional concentrate material is added to the fluid carrier to replenish the carrier solution.

U.S. Pat. No. 4,222,497, assigned to the assignee herein, relates to a more sophisticated toner concentrate control system compared to most of these previous systems in that measurements of transmissivity of the fluid carrier are more accurately determined by periodically determining the transmissivity of a flow cell when no fluid carrier is in the cell, which measurement is substrate from the measurement of transmissivity of the fluid carrier when present and flowing through the cell. In this manner, the transmissivity of the fluid carrier per se may be accurately determined. In establishing a predetermined standard of measurement by eliminating effects of aging of the illumination source and photodetector for the flow cell or the effects of stained conditions developed on the interior walls of the flow cell over a period of time, an accurate determination of toner concentrate depletion in the fluid carrier can be realized.

The system of U.S. Pat. No. 4,222,497 also provides a means to discontinue pumping of the toner fluid carrier throughout the system in the event that comparison values indicate that apparently no fluid carrier is in the flow cell or the system is being pumped with air bubbles or other highly transmissive material. A signal is generated under such conditions, which is operative to shut off the toner pump. It is not desirable to make transmissivity measurements when air bubbles are passing through the flow cell because they provide a transmissivity measurement of high value indicating a depletion of toner concentrate has occurred requiring replenishment when, in fact, the toner concentrate may not need replenishing.

What is needed is some means by which the system can monitor the transmissivity of toner concentrate and "ignore" the passage of air bubbles or other sudden changes in the monitored toner transmissivity while passing through the system flow cell. In this manner, the system is "smart" in only requiring the addition of toner concentrate to the fluid carrier, when the toner concentrate does actually need replenishing.

SUMMARY OF THE INVENTION

According to this invention, a system monitors the concentration of material in a fluid carrier which includes means for circulating the fluid carrier within a substantially closed loop system and means for measuring the concentration of material carried in the fluid. The measuring means includes means to detect rapid changes in transmissivity of the fluid carrier, which are indicative of the presence of entrained air bubbles in the fluid carrier, so that measurements of material concentrate under such conditions may be ignored or rejected. Further, to ensure that an accurate measurement of concentrated material depletion is being observed, more than one consecutive measurement is made and validated before concentrate is finally added to the fluid carrier in the system.

In the preferred embodiment, the determination of whether air bubbles may be entrained in the fluid carrier is accomplished by determining a disparity between two consecutive measurement samples to have been greater than a predetermined value. If such a disparity exists, the measurement sampling rate is increased until the disparity between consecutively measured samples is again less than the predetermined value, at which time sampling is again performed at slower sampling rate. If a disparity exists between several consecutive samples and the disparity in each case remains below the predetermined value, the samples so observed are determined as valid and representative of continuous depletion of the concentrate material in the fluid carrier. When several of these consecutive and validated sample values exceeds a predetermined threshold and there has been no interruption in such sampling due to a disparity between samples greater than the predetermined value, an enablement will be provided to permit concentrate material to be added to the fluid carrier.

The system of this invention has particular application to the monitoring the level of toner concentrate in a fluid carrier of fluid toner development system in an electrographic printer/plotter system or machine. Such a printer/plotter system or machine may have a single toner development system for a single color, e.g. black or may have a multiple color toner development system wherein four colors, e.g. black, cyan, magenta and yellow, are provided respectively with four fluid toner development systems in the same printer/plotter system or machine.

Other objects and attainments together with a fuller understanding of the invention will become apparent and appreciated by referring to the following description and claims taken in conjunction with the accompanying drawings.

DESCRIPTION OF THE PREFERRED EMBODIMENT

In describing this invention, reference will be made to its application to the toner development system used in electrographic printing. However, it will be obvious to those skilled in this art that the system of this invention is equally applicable to any system wherein the concentrate of material in fluid carrier or medium needs monitoring and periodic adjustment to maintain a predetermined level of material concentrate in the fluid carrier.

Figure 1:
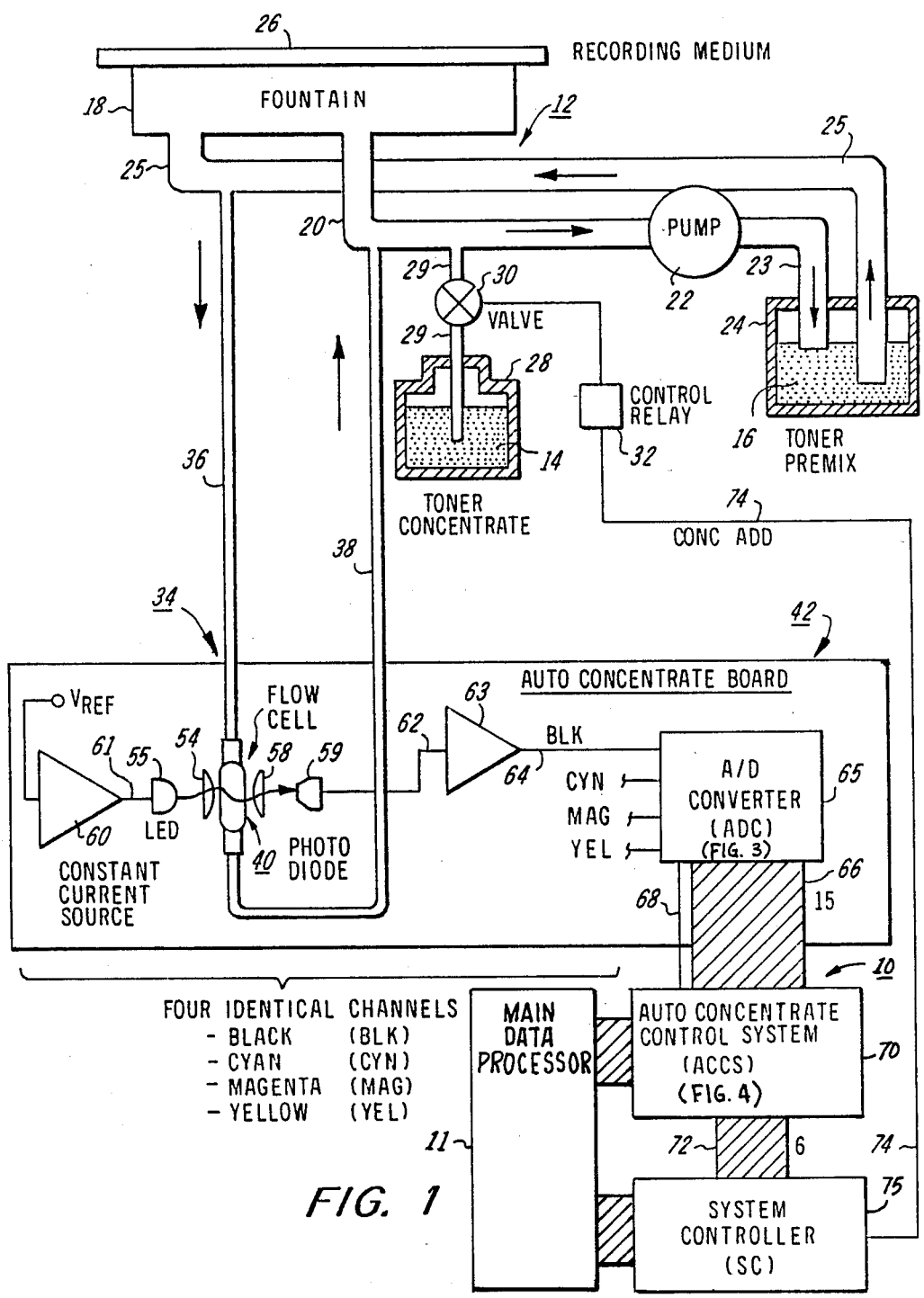
FIG. 1 illustrates an overview of the system of this invention as employed in the development system of an electrographic machine.

Reference is first made to FIG. 1 which illustrates the overview of system 10 of this invention in relationship to a toner development system 12 wherein the toner concentrate 14 in the fluid carrier 16 of the system 12 is being monitored.

The toner development system 12 comprises a toner fountain assembly 18 having an outlet conduit 20 connected to the inlet of a pump 22. The outlet of pump 22 is connected to conduit 23 leading into toner premix bottle 24 containing fluid carrier 16. Conduit 25 leads from bottle 24 to the inlet of toner fountain assembly 18.

Assembly 18 is characterized as vacuum or suction toner fountain. The toner carrier 16 is brought to assembly 18 from bottle 24 only if a hermetic seal is formed between the electrographic recording medium 26 and the open portion of assembly 18. If the seal has been properly made, pump 22 will be enabled to draw a vacuum in assembly 18 causing toner fluid to be withdrawn from bottle 24 via conduit 25 into assembly 18 and thence return to the toner premix bottle 24 via outlet conduit 20, pump 20 and conduit 23. An example of this type of toner fountain assembly may be found in U.S. Pat. No. 4,289,092.

The development system 12 is not a limitation as to the use of system 10 of this invention. For the particular application here, other types of development systems may be used, e.g., a liquid toner development assembly of the roller type disclosed in U.S. Patent Application Ser. No. 517,158 filed July 25, 1983, now U.S. Pat. No. 4,454,833.

A toner concentrate bottle 28 containing toner concentrate 14 is connected to outlet conduit 20 by means of conduit 29. A solenoid valve 30, placed in conduit 29, is operated by means of control relay 32 via electrical lead 31. When toner concentrate 14 is being added to system 12, control relay 32 is operated from system controller (SC) 75 to open solid valve 30 and permit toner concentrate to be drawn out of bottle 28 under the suction action of pump 22 via conduit 29 and into conduit 20.

Between the toner fountain inlet conduit 25 and the outlet conduit 20 of system 12, there is provided a fluid bypass system 34 in the form of inlet conduit 36 connected from toner fountain assembly inlet conduit 25, transparent flow cell 40 and outlet conduit 38 connected into assembly outlet conduit 20. Flow cell 40 is mounted on auto concentrate PC board 42 in the manner illustrated in FIG. 1.

Figure 2:
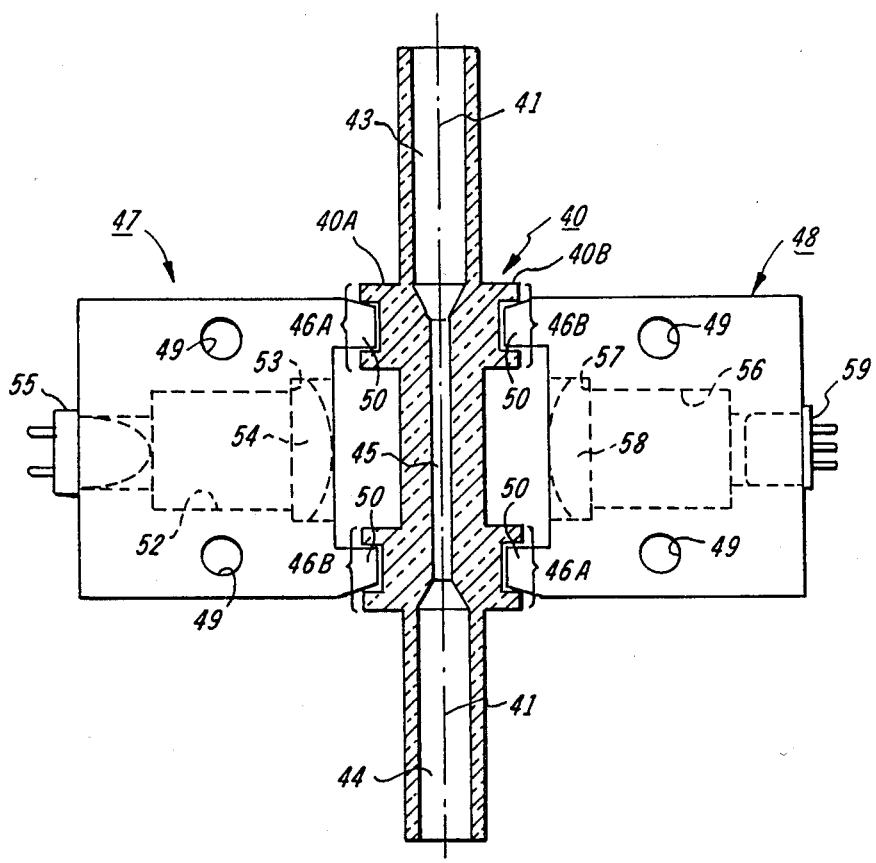
FIG. 2 is a side elevation with parts in cross section of a flow cell used in the system of this invention.

As shown in FIG. 2, flow cell 40 comprises two complementary identical transport members 40A and 40B (indicated by dotted line 41 in FIG. 2) which interlock and are sealed together. The internal flow path of cell 40 includes end conduits 43 and 44 coupled to central narrow flat passageway 45. The exterior of flow cell members 40A and 40B each include a pair of shoulder slots 46A and 46B.

Flowcell positioning mounts 47 and 48 respectively include a bifurcated portion 50 on the forward end of each mount. Mounts 47 and 48 are secured to board 42 by means of fastening devices through openings 49 provide in each mount 47 and 48.

Mount 47 has central full length cavity 52, which cavity has at least one step 53 for supporting the objective lens 54 at one end of the mount. The other end of cavity 52 supports a light source 55, e.g., an LED or incandescent lamp.

Mount 48 also has a central full length cavity 56, which cavity has at least one step 57 for supporting the objective lens 58 at one end of the mount. The other end of cavity 56 supports a photodetector 59, e.g., a photodiode.

As shown in FIG. 1, LED 55 is provided with a constant current source 60 to maintain a constant current supply via line 61 to LED 55. In this manner, the illumination intensity output of LED 55 is maintained fairly constant.

The illumination from LED is collimated by lens 54, passes through the transparent walls of cell 40 and is focused by lens 58 onto photodiode 59. The output of photodiode 59 on line 62 is amplified by amplifier 63 and is supplied as a signal on line 64 to the analog to digital converter (ADC) 65 on board 42. ADC 65 provides a digital representation of the signal from photodiode 59 and representative of a measurement of the transmissivity of cell 4 and, therefore, a sample of the instantaneous toner fluid transmissivity passing through flow cell 40. The associated circuitry and function of ADC 65 will be discussed in detail in connection with FIG. 3.

It should be noted at this point that the discussion of system 10 has been limited to a single toner system 12 and single flow cell 40. Such a single toner system usually comprises black (BLK) toner. However, as indicated near the bottom portion of FIG. 1, there may be several cells 40 for a multitoner development system, e.g., three additional such cells, each respectively connected to a respective toner development assembly 18 included with system 12. Each such assembly respectively provides a different toner color concentrate in a fluid carrier. As indicated, the three toner mediums may comprise cyan (CYN), magenta (MAG) and yellow (YEL). In such a multitoner development system, the analog inputs from the photodiodes of each of the respective flow cell transmissivity measurements for each of these colors are also provided as inputs to ADC 65 in the manner illustrated in FIG. 1.

ADC 65 is coupled to automatic concentrate control system (ACCS) 70 which comprises a microcomputer operated under the control of a computer program to receive the digital samples of concentrate value developed by ADC 65 and compare the received values with a previously determined value as well as a predetermined threshold value to determine if the measured sample value is valid sample or a rejected sample.

Also coupled between ADC 65 and ACCS 70 are power supply lines 68 for providing operating power to ADC 65. ACCS 70 will be discussed in detail in connection with FIG. 4.

ACCS 70 is coupled to the system controller (SC) 75 by means of flat cable 72. SC 75 pertains to the electromechanical functioning of the electrographic machine and toner development system 12, e.g., the operation of solenoid valve 30 by the signal, CONC ADD, meaning "concentrate add", which signal is connected to control relay 32 by line 74 from SC 75. Other functions of SC 75 include hydraulic positioning of toner fountain assembly for toning operation and operation of toner pump 22. SC 75 does not form part of this invention and, therefore, will not be discussed in detail and will be referred to relative to various signals from SC 75 to ACC 70 including the signal CONC ADD on line 74.

Figure 3A:
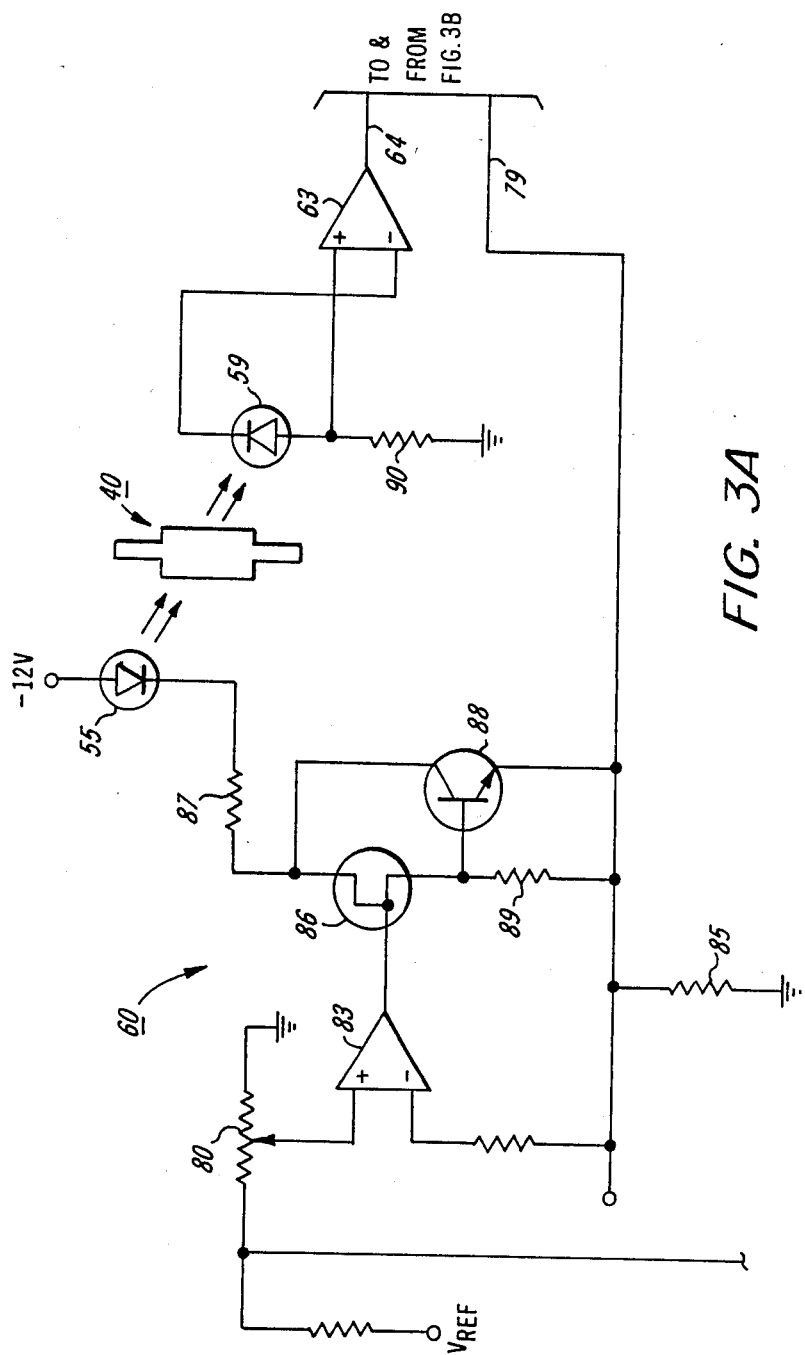
FIG. 3 illustrates a diagrammatic block diagram of the ADC circuit portion of the control system for this invention.
Figure 3B:
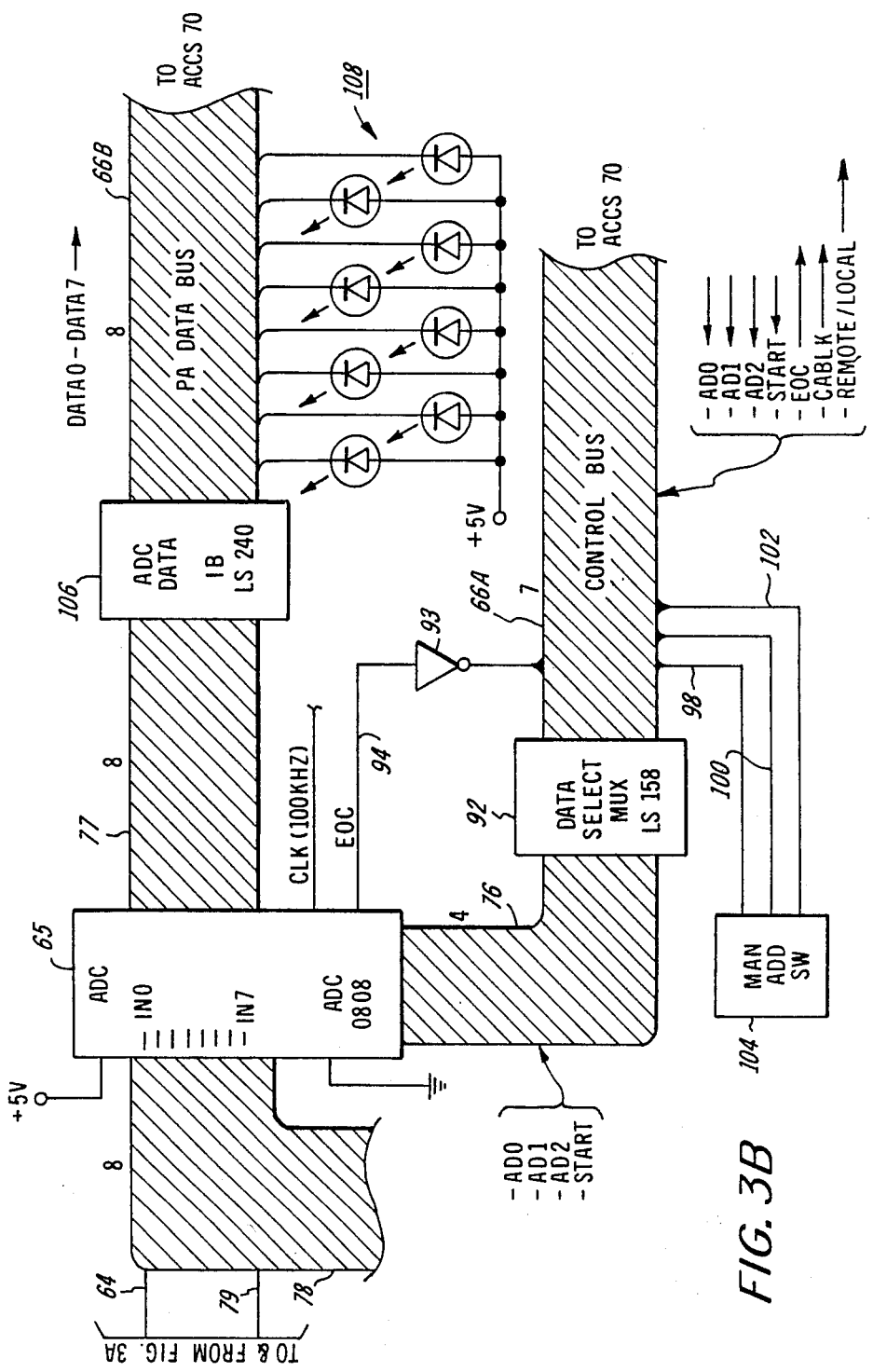

Reference is now made to FIG. 3 to explain in detail the associated circuit and operation of ADC 65. ADC 65 comprises chip designation ADC 0808 commercially available from National Semiconductor Company and Texas Instruments Inc. and primarily functions to receive analog data at selected inputs of its eight inputs IN0 to IN7 according to addresses received on bus 76 from data multiplexer 92 and convert that data into a binary representation of a data byte comprising eight bits which is placed on output bus line 77. In particular, pairs of the eight inputs to ADC 65 are coupled to respective sensor circuits 39, one for each flow cell 40 of a corresponding toner color development system 12. Only one such sensor circuit 39 need be shown since each such sensor circuit is identical to circuit 39 with corresponding output line pairs provided as inputs to ADC 65 by means of cable 78.

Sensor circuit 39 begins with a constant current source 60 to precisely control the current of LED 55 and provide temperature compensation. Source 60 includes potentiometer (POT) 80 connected to voltage reference source, $V_{ref}$. The output of POT 82 is the noninverted input to operational amplifier 83. The inverting input to amplifier 83 is connected to current sense line 79 via input resistor 84. The current on line 79 is a measure of the current through LED 55 as provided by current sense resistor 85 connected to ground. The voltage drop across resistor 85 is the inverting input to operational amplifier 83 and the voltage output from POT 82 is the noninverting input of operational amplifier 83. POT 82 adjusts the output of amplifier 83 to adjust the intensity level of LED 55 which must be calibrated within its specified rating for each respective color and must be calibrated from time to time due, for example, to changes in circuit component values.

Amplifier 82 is coupled to a circuit comprising JFET transistor 86 and NPN transistor 88 to offst any variations caused by temperature changes. It also forms a precision current sink. The output of amplifier 83 is connected to the base of transistor 86 which has its drain connected to the cathode of LED 55 via bias resistor 87. The anode of LED is connected to a voltage source. The source of transistor 86 is connected to the base of NPN transistor 88 and to the current sense line 79 via limit resistor 89. The collector and emitter of transistor 88 are connected across the drain of transistor 86 and current sense line 79.

The response output of photodiode 59 is connected to inverting and noninverting inputs of operational amplifier 63 with photodiode 59 biased relative to ground by means of resistor 90. The cathode of photodiode 59 is connected to the noninverting input of amplifier 63 and the anode of photodiode 59 is connected to the inverting input of amplifier 63. As previously indicated, the output of amplifier 63 is connected to ADC 65 via line 64, in this case to input IN0 of ADC 65. Line 79 is connected to input IN4. The inputs of the other three sensor circuits 39 would be respectively, IN1 and IN5 (CYN); IN2 and IN6 (MAG); and IN3 and IN7 (YEL).

ADC 65 has four input control lines from data selector multiplexor 92. These control lines are AD0, AD1, and AD2 and START. Address lines AD0-2 represent a binary code to permit ADC 65 to select a pair of inputs from any one of the sensor circuits 39 and enable the sensing of the analog output of photodiode 59 and perform a digital conversion for output on data bus 77 in the form of an eight bit byte, DATA 0-DATA 7, which is also referred to as "PA Data" (PA having reference to "Port A", which will be explained later.). The three inputs AD0-2 provide eight possible combinations for input selection. START is a signal received from ACCS 70 to cause ADC 65 to latch in the address received on lines AD0-2 and enable the conversion function to be performed for the particular sensor circuit 39 connected to the inputs of ADC 65.

When ADC 65 has completed the conversion, it provides output signal, termed EOC, meaning "End Of Conversion", which is an indication of a completion of the analog to digital (A/D) conversion. The EOC signal is provided on line 94 via inverter 93 to control bus 66A. EOC is provided as both an input signal to buffer 92 and an input signal to ACCS 75 via control bus 66A, which is a portion of bus 66 in FIG. 1.

Other inputs to multiplexer 92 include three input lines 98, 100 and 102 from manual add switch (MAN ADD SW) 104, the function of which will be explained later.

The output eight byte output PA Data provided on bus 77 from ADC 65 is provided to ACCS 70 via data output bus 66B (part of bus 66) via ADC data inverting buffer 106. Buffer 106 provides a latch function for the PA Data to ACCS 70 as well as a signal driver for the data on bus 66B and a driver for the LED readout display 108. Display 108 comprises eight LEDs, one for each of the eight data lines and provides a digital readout for use in the calibration of sensor circuit 39.

Beside the four input signals from ACCS 70 comprising AD0, AD1, AD2 and START to multiplexor 92, there are also output signals to ACCS 70 comprising the signals EOC, CABLK and REMOTE/LOCAL. As previously indicated, signal EOC from ADC 65 denotes that an A/D conversion has been completed relative to a particular selected input sensor circuit 39 and that the PA Data for the conversion is available at the output of buffer 106.

The signal CABLK, or "cable locked", is an indication from multiplexor 92 to ACCS 70 that the cable or bus 66 is connected for functioning. The signal REMOTE/LOCAL, also from multiplexor 92 to ACCS 70, is to indicate whether ADC 65 is being operated in a local mode of operation for purposes of calibration of sensing circuit 39 and, therefore, PA Data on bus 66B is not true and should not be utilized or to indicate that ADC 65 is being operated in a REMOTE mode so that PA Data present on bus 66B is true and should be used to determine the validity of measurement samples produced by ADC 65. Thus, the signals CABLK & REMOTE must both be true in order for ACCS 70 to proceed with its fundamental functioning.

Multiplexor 92 allows for LOCAL or calibration mode of operation by providing a self-conversion routine to test ADC 65. A toggle switch (not shown) allows the signal EOC to loop around from line 94 back into multiplexor 92 to function as the signal START for ADC 65. Also, manual address switch 104 permits the manual setting of the three bit address AD0, AD1, AD2 to ADC 65 to select the desired sensor circuit input to ADC 65. As the EOC signal is present on line 94 signifying that an analog to digital conversion for an address selected input from a sensor circuit 39 has been accomplished, this signal is employed in the LOCAL mode as a START signal causing the conversion routine to be repeated. With this routine continually repeated until terminated at the toggle switch, the current value output of operational amplifier 63 can be calibrated by observing the output of display 108 and adjusting POT 80. Other three bit addresses may be selected at switch 104 to calibrate other sensor circuits 39 in the same manner.

Reference is now made to the details of ACCS 70 in FIG. 4. The heart of ACCS 70 is the microcontroller or microprocessor (MC) 110 coupled by low address/data bus 112 and high address bus 114 to EPROM 116. As is well known, microcontroller 110 in this embodiment is the Intel Corporation 8031 eight bit microprocessor using a sixteen bit address. In the embodiment here, eleven of the sixteen bit output of microcontroller 110 are employed for addressing. Low address/data bus 112 presents the transfer of eight bit bytes for address and data and high address bus 114 presents the last three bits for address. As is standard for MC 110, bus 112 is a multiplexed bus that provides a time shared path for transfer of addresses as well as eight bit data between port P0 of MC 110 and EPROM 116

As is well known, MC 110 has a combined external program memory and external data memory capability and can operate to make selections to either type of memory.

EPROM 116, chip designation 8755 avaiable from Intel Corporation, provides program store for operation of MC 110. EPROM 116 further provides I/O facility for input and output of data. Port A of EPROM provides an I/O facility for input of the eight bit PA Data from ADC 65.

Hence the term "PA" is derived from "Port A". Port B of EPROM provides an I/O facility for control signals between MC 110 and ADC 65 including an input for the signals EOC, CABLK and REMOTE/LOCAL from multiplexor 92. Port B is also an output for the three bit address AD0, AD1, AD2 & START from MC 110 when ADC 65 is set in the REMOTE mode of operation.

The invention buffers 118 and 120 respectively in buses 66A and 66B provide for strong drive signal capability for the flat cable 66 with good noise rejection.

Two additional inputs are provided for adding toner concentrate 14 manually to toner developer system 12. One input is provided at line 119 to Port P3 of MC110 and comprises a toggle switch input determinative of whether tone concentrate is to be added manually to system 12 or toner concentrate add is to be determined by the functional operation of ACCS 70. Another input 121 is included in bus 66A as one additional input between buffer 118 and Port B of EPROM 116. Input 121 is MAN ADD and comprises a push button to permit the manual add of toner concentrate to system 12 when AUTO/MAN on line 119 is in the MANUAL mode of operation.

Control line 112 between Port P3 of MC 110 and EPROM is an address latch and enable (ALE) signal. This ALE signal enables MC 110 to latch in an address fetch from program memory in EPROM 116. Control line 124 between Port P3 of MC 110 and EPROM is a program store and enable (PSEN) signal. This PSEN signal enables EPROM 116 to permit the time share retrieval by MC 110 of fetching another program instruction or PA data from EPROM 116.

Low address/data bus 112 is coupled to low address latch 126 and EEPROM 128. EEPROM 128 is a nonvolatile RAM and latch 126 functions as its low order address latch since this EEPROM does not have an internal latch for this function as does EPROM 116. EEPROM 128 provides for a nonvolatile storage of system parameters such as operator imposed SW values provided at the control panel of the electrographic machine. These SW values would override any corresponding SW value at the DIP switches 136 if introduced by the machine operator. EEPROM 128 may also provide an extra memory store for other functions of MC 110 as well as higher address memory store for EPROM 116. In this connection, high address selection via buses 112 and 114 to EEPROM is determined by a true or high input in the high address select line (HI ADDR SELECT) 127 to EEPROM 128. With a true inlet on line 127, a READ enable on line 129 or a WRITE enable on line 131 may be provided by MC 110 to EPROM 128.

The low order address latch also functions as an address latch to the external data memory address decoder 132 to provide a three bit address value, LLOW, on bus 130 to permit decoder 132 to select one of four switch (SW) values represented in binary form at eight position DIP switch 136. This three bit address provides for eight different selections to permit decoder 132 to select one of eight outputs, four of which are 138 (BLK), 140 (CYN), 142 (MAG) or 144 (YEL). The line selected is provided to a respective inverting buffer 134 and when true, enables buffer 134 to place the SW value from switch 136 onto the SW data bus 146 to MC 110. There are four DIP switches 136 and corresponding buffers 134 for each toner color for selectively enabling the color SW value onto. 146 For the sake of simplicity, only one such buffer and DIP switch is shown in FIG. 4. The SW values represent a predetermined minimum toner concentrate value below which the toner concentrate should not fall in the fluid carrier.

The bus from system control (SC) 75 is connected to port P1 of MC 110 via inverting buffer 150 except for the system reset signal, RST, which is provided to MC 110 via line 152. Bus 72 entails four input signals from SC 75 to MC 110 and two output signals from MC 110 to SC 75. Of the input signals, system reset (RST) is a power-on reset for MC 110 to initialize its operation including the setting of register values, etc. The signal TENBL, is toner enable which is an indication from SC 75 that the toner fountain assembly 18 is in operational position and the toner development system 12 is functioning providing toner fluid carrier to toner fountain assembly 18. The signal inputs TNR SELECT 0 &

TNR SELECT 1 together provide an address for the switch 136 that MC 110 should select for the color to be monitored. This TNR SELECT address value is proper for the particular toner fountain assembly 18 that has been enabled.

The MC 110 outputs on bus 72 are the signals CONC ADD & CONC OUT. When CONC ADD is true, it is representative of toner concentrate 14 added to system 12 via SC 75 and line 74 to control relay 74 to solenoid valve 30. When CONC OUT is true, it is representative of toner concentrate 14 being exhausted from bottle 28 as determined by MC 110 according to program control.

The control port P3 also provided the READ/-WRITE (R/W) output 148 for decoder 132 indicating when MC 110 is to read SW value data from DIP switch buffer 134. Output 148 is ORed together READ and WRITE enables from MC 110.

The remaining portions of ACCS 70 show in FIG. 4 do not directly contribute to this invention but provide an option for receipt of eight bit color data to and from main processor 11 and operator panel of the electrographic machine for the purpose of providing operation control of the SW values to ACCS 70 as well as indicating at the machine control panel the instaneous SW value accessed by ACCS 70 for a particularly selected fountain system 12. Main processor 11 functions as the master control for operation of the machine including the handling of the recording data addressing of the electrographic head of the machine.

If the machine operator desires to change the SW value for a particular fountain system, the new binary value in the form of an eight bit byte of data is received along color bus 154 to inverting buffer 156 and thence to in-data latch 160 via bus 157 for output onto low address/data bus 112 to MC 110 and for storage to EEPROM 128. By the same token, the binary value in the form of an eight bit byte of data representative of a selected SW value from a selected DIP switch 136 or a corresponding override SW value from EEPROM 128 is provided on bus 112 and latched into out-data latch 162 and out onto color bus 154 via bus 159 and inverting buffer 158. Buffers 156 and 158 provide the conventional functions of buffering the data while providing signal driving with some noise rejection or immunity. Buffer 158 is enabled to output eight bit data on color bus 154 via signal control from the machine main processor 11 when it is prepared to receieve such data. Buffer 156 is a transparent buffer with its enable connect to ground so that eight bit data received at its input from color data bus 154 is immediately placed as an output on bus 157 to data latch 160.

The decoder 132 has four additional address locations besides those for color SW values, two of which are for respectively enabling out-data latch 162 via line 141 and enabling in-data latch 160 via line 143. These two outputs of decoder 132 are selected via a three bit address from MC 110 via LLOW bus 130. Data to be read in from latch 160 and placed on bus 112 from color bus 154 is accomplished by address selection of decoder output for line 143 and enable R/W signal on line 148 from MC 110. Data to be read out onto color bus 154 from bus 112 is accomplished by address selection of decoder output for line 141 and enable R/W signal on line 148 from MC 110. The input RST to latch 162 is system reset on line 152 and clears latch 162 for receipt of the next eight bit byte of data representative of SW value.

The inverting buffer 172, external address decoder 174 and data flag 176 provide for the organized transfer of data between machine main processor 11 and MC 110 via color data bus 154 from the point of view of the main processor 11 board. A four bit address comes from machine main processor via bus 164 to inverting buffer 172 and thence to external address decoder 174. There are eight possible addresses for selection of any one of eight outputs of decoder 174. The READ and WRITE signals from the main processor 11 are inputs to buffer 172 via lines 166 and 168 and ORed together to provide the READ/WRITE (R/W) signal on line 169 to enable the selected output of decoder 174.

The output line 178 from decoder 174 is coupled to data flag 176 as well as an enable to data latch 160. Data flag 176 is a D flip flop. The output line 180 from decoder 174 is coupled as an enable to output inverting buffer 158.

A brief description of the operation of decoder 174 is as follows. In order for machine main processor 11 to receive data along the color bus 154, a four bit address is sent along bus 164 to decoder 174 via buffer 172. The address selects decoder output line 180. Then a READ (RD) command is provided along line 168 and buffer output line 169 which prepares latch 158 via decoder line 180 from main processor 11 for output functions onto color data bus 154. The RD enable signal is followed by an ENABLE (EN) command signal along line 170 via latch output line 171 to clock the data in buffer 158 out onto bus 154.

By the same token, a four bit address from machine main processor 11 comes in on bus 164 to decoder 174 selective of output line 178. Then a WRITE (WR) command signal is provided along line 166 and buffer output line 169 which is placed as an output on line 178 preparing in-data latch 160 for enabling its output onto bus 112. This command signal also sets data flag 176 providing a flag on its output line 181 to MC 110 indicating that data is about to be placed on bus 112. This command is followed by an ENABLE (EN) command signal on line 170 via latch output line 171 to clock the data into latch 160. ENABLE (EN) signal on line 170 from machine main processor 11 is another enable level signal which provides the possibility of several locations that may be addressed by decoder 174. This data is then read out of latch 160 onto bus 112 to MC 110 and EEPROM 128 by an enable signal via line 143 from decoder 132 when MC 110 is prepared to receive such data.

Upon latching of the data by MC 110, a reset (R) is sent by MC 110 to the reset input of data flag 176 via line 182.

An explanation will now be made relative to the operation of ADC 65 and ACCS 70 under the program control of MC 110 as exemplified by the logic flow diagram of FIG. 5.

Figure 4A:
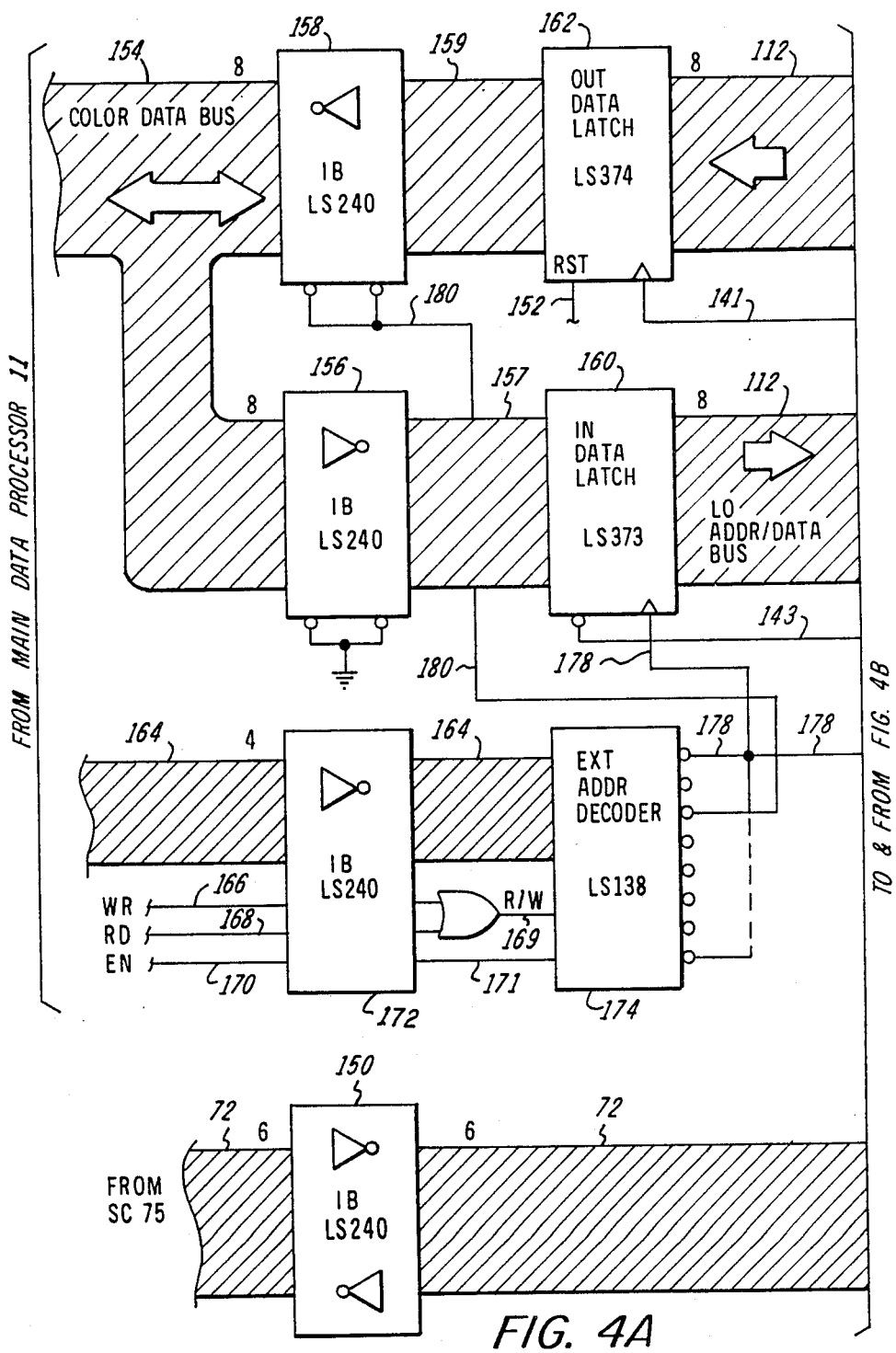
FIGS. 4A, 4B and 4C illustrates a diagrammatic block diagram of the ACCS circuit portion of the control system for this invention.
Figure 4B:
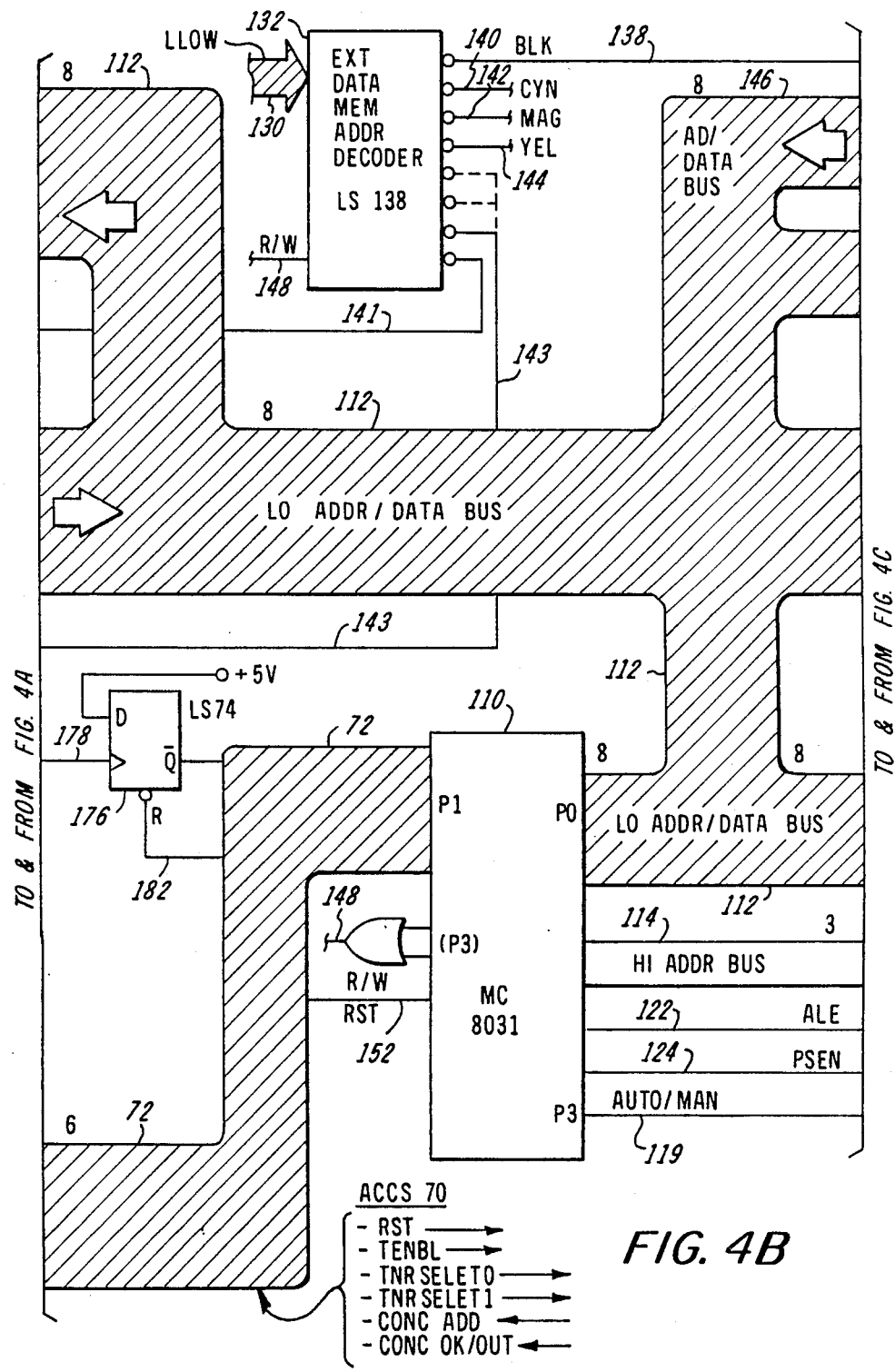
Figure 4C:
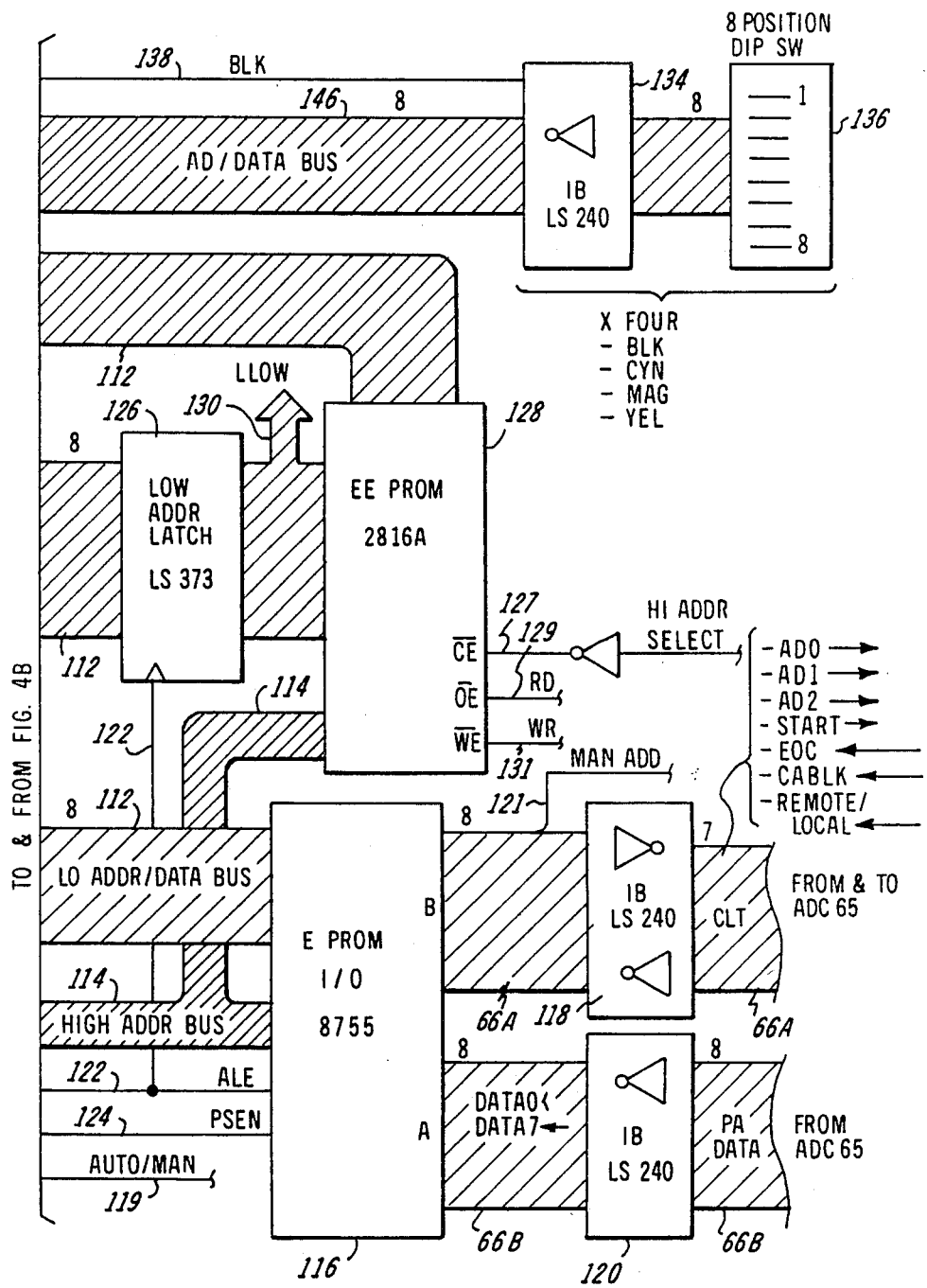
Figure 4D:
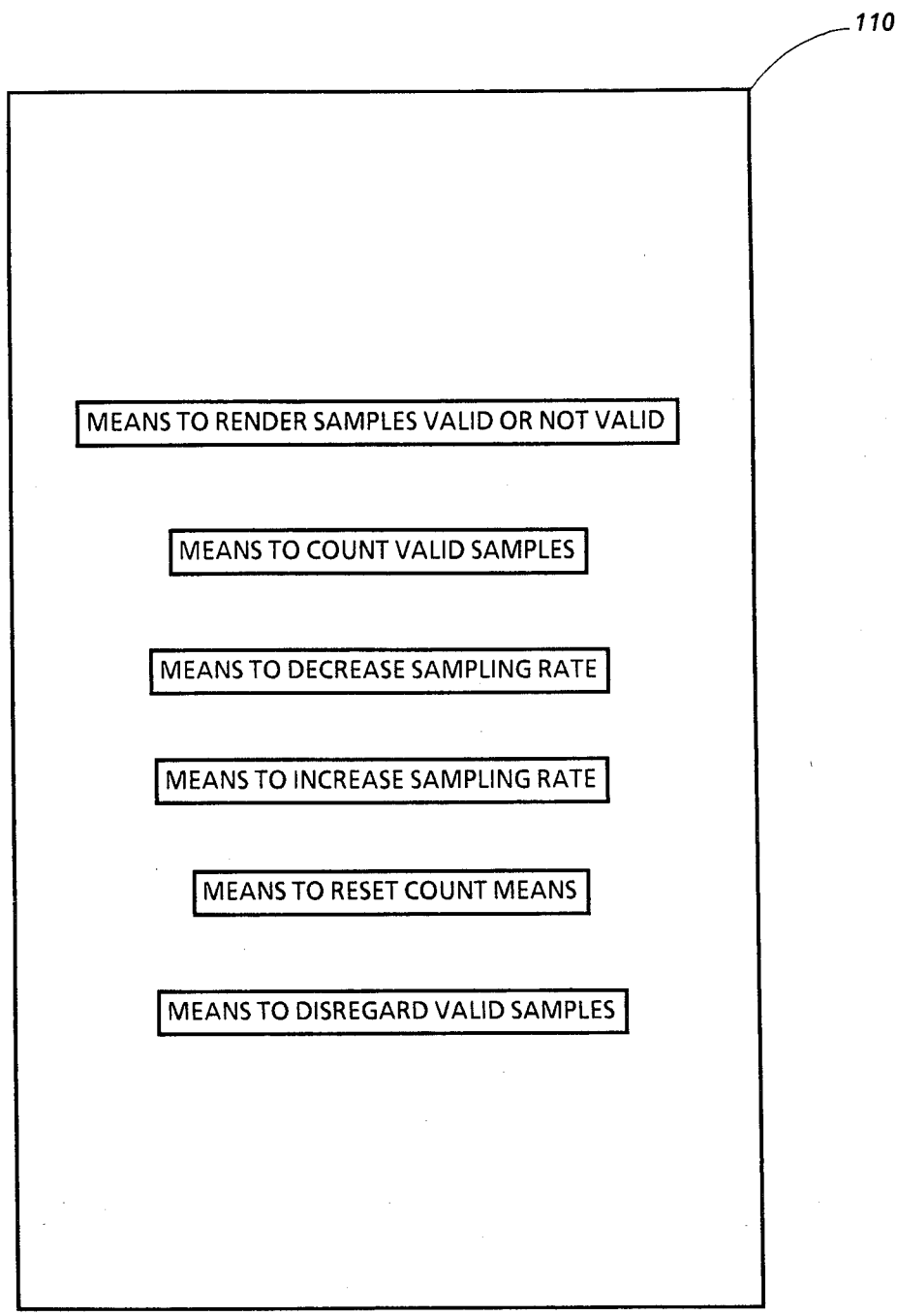
FIG. 4D is a block diagram of the processor of the control system of this invention, shown in FIG. 4B, with different functional means illustrated for carrying out the invention.

FIG. 4D illustrates processor MC 110 and some of the different functional means performed by this processor for carrying out the monitoring and maintaining a predetermined amount of concentrate in a fluid carrier.

It should be noted that the logic flow chart of FIG. 5 is illustrative of program operation for enablement of a single toner fountain assembly for a single color electrographic machine or a single toner fountain assembly for a multicolor, multitoner fountain electrographic machine. The program is, therefore, repeated for sequentually enabled and selected color toner fountain assemblies.

Figure 5A:
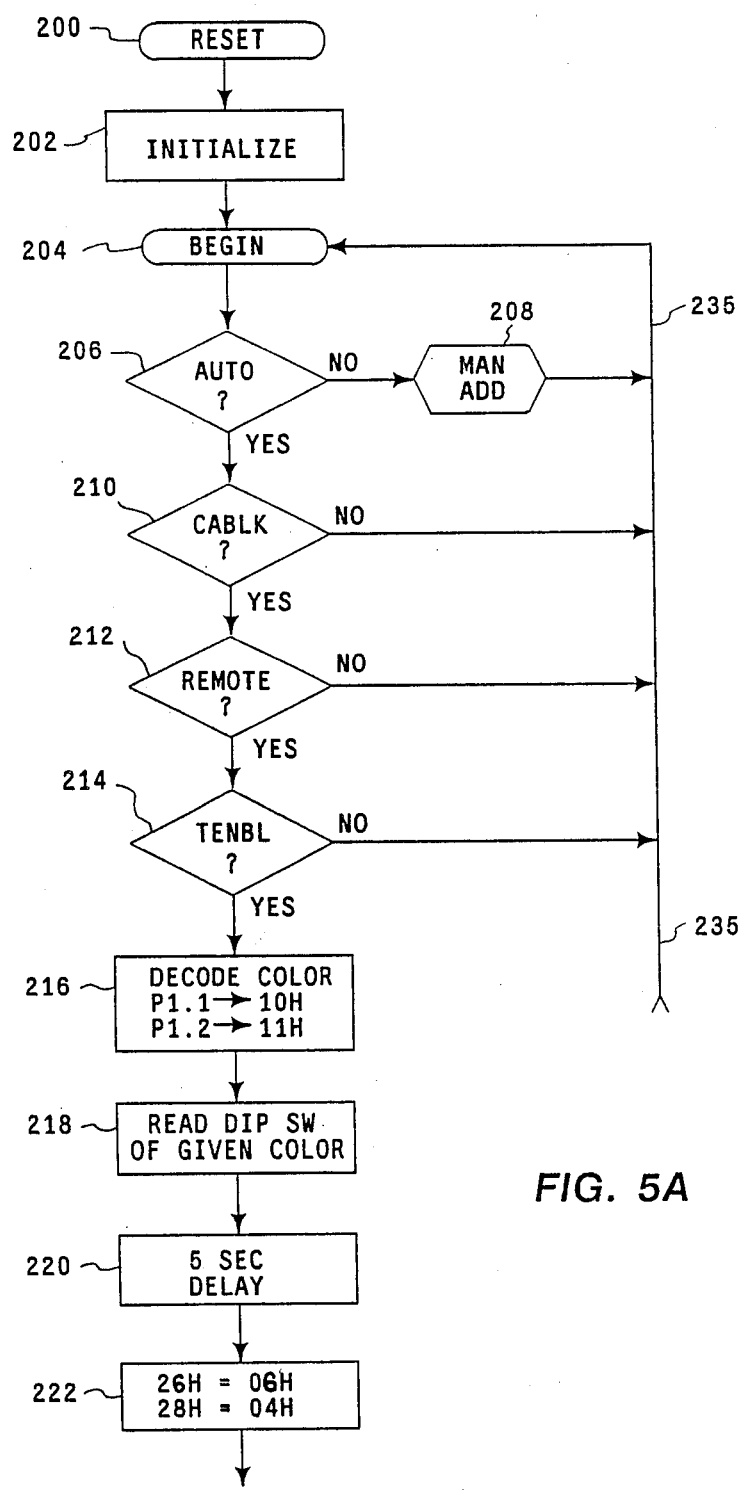
FIGS. 5A, 5B and 5C is a logic flow chart descriptive of the application program and functional operation of the system of this invention.

Beginning with FIG. 5A and with the application of power, reset (RST) 200 is initiated from SC 75 via bus 72 which introduces appropriate reset conditions at MC 110 as well as the start of an initialize routine 202 to set up input and output ports of the processor for specific start conditions and writing initial values into certain registers of MC 110 that are employed as timers in the program. At this point, MC 110 is prepared for the beginning of program operation designated at BEGIN 204.

The first action taken is the determination of several enablements: AUTO 206, CABLK 210, REMOTE/LOCAL 212 and TENBL 214. If testing of any of these enablements indicates a not true situation, the program will return via line 235 to BEGIN 204. The test at AUTO 206 is a determination as to whether the system 10 is in AUTOMATIC mode or MANUAL mode as determined at AUTO/MAN toggle switch on line 119. If this switch is in MANUAL mode, toner concentrate may be added via MAN ADD on line 121. This function is illustrated at 208 in FIG. 5A.

If system 10 is in AUTO mode, a test at 210 is made, called CABLK, to determine if the cable for bus 66 is connected between ADC board 42 and the board for ACCS 70. If this cable connection is determined as true, a check is made to determine REMOTE/LOCAL 212, i.e., whether ADC 65 on board 42 is in a LOCAL mode of operation for purposes of calibrating the operation of the ADC or is in a REMOTE mode of operation for purposes of carrying on automatic sampling by MC 110. If it is determined that REMOTE mode is true, then a check is made to determine if a selected toner development system 12 has been enabled, i.e., TENBL 214 is true. This enable signal comes from SC 75 as previously explained. If this is in a true or enable state, then system 10 is prepared to begin automatic sampling of the toner concentrate flowing through flow cell 40 based upon the particular color toner development system 12 that has been enabled. However, certain information must be derived as to the particular toner color that has been activated, as TENBL is only indicative that one of several toner fountain assemblies 18 has been activated. Also, information must be derived as to the particular SW value for the chosen toner color. Further, two registers are loaded with a predetermined count for decrementation, as will be explained below.

With TENBL true, an interrogation is made to determine which toner color system 10 ACCS 70 will be dealing with for purpose of toner concentrate sampling. This determination, designated at 216 in FIG. 5A, is derived from a two bit address, TNR SELECT 0 & TNR SELECT 1 received from SC 75 on bus 72 to MC 110. The address for the respective color provides the address for the particular SW value that must be retrieved from an appropriate DIP switch 136. The color address is a dual input on pins 1 and 2 of Port P1 of MC 110 each being a two bit binary code.

The next function performed by MC 110 is indicated at 218 and is to direct the color address on bus 112 via bus 130 to decoder 132 and enable the selected decode output and read the selected color SW value from buffer 134 via bus 146 to MC 110. In essence, this switch value is liken to an external data memory to MC 110. This eight bit value is representative of a reference below which toner concentrate in the fluid carrier should not fall. This SW value will be later compared with sampled PA data values received from ADC 65.

The next function is designated at 220 and is a five second delay before any sampling is made by ADC 65. This is done to ensure that the enabled toner development system 12 has stabilized in a steady state operation. A large number of air bubbles usually occur on toner start-up and the five second delay ensures that the bubbles have dispersed from the fluid carrier and the toner concentrate is thoroughly mixed in the fluid carrier.

The next function, designated at 222, is the loading of two registers in MC 110 with respective values that represent (1) the maximum number of times that will be allowed by system 10 to permit toner concentrate to be added during the continuous run of an enabled toner development system 12 and (2) the number of consecutive valid samples that must occur before a CONC ADD signal will be initiated, provided that at least the last of such consecutive samples exceeds the SW value obtained from the particular color DIP switch 136. In the particular operation exemplified here, the maximum number of CONC ADD's that will be allowed in any uninterrupted fountain assembly operation will be six (26H=06H). This is termed herein as the maximum add counter in MC 110. The number of valid samples that must occur before a CONC ADD will be initiated is four (28H=04H). This is termed herein as the add counter in MC 110. Of course, these values may be changed to meet given requirements desired for a particular color toner concentrate add.

After these register values in MC 110 have been set, a check again is made at 224 (FIG. 5B) to determine if system 10 is in AUTOMATIC mode. If this is true, the program will continue. If this condition is not true, MANUAL mode is set and the manual add of toner concentrate is possible if so desired, as designated at MAN ADD 226. In any case, the program will revert back to BEGIN 204 at this point in time. It is desirable to have an AUTO/MAN mode check at this point in the program in order that the automatic sampling mode of operation of MC 110 may be interrupted, as the program loops around for performing consecutive PA data sampling, as designated by line 223 in FIG. 5B, as will become clearer in later description. Otherwise, the only other way system 10 may be interrupted in its operation is TENBL becoming not true, i.e., dienabling of the enabled toner development system 12.

If system 10 remains in AUTO mode, a signal START is sent from MC 110 via EPROM 116 and its Port B to ADC 65 via bus 66A. This function is indicated at 228 in FIG. 5B. The START signal is provided to ADC 65 via multiplexor 92 and bus 76. By the same token, the address selection for the appropriate ADC input of the selected sensor circuit 39 is provided out of EPROM 116 on bus 66A via multiplexor 92 to ADC 65. Program delay 232, PGDLY, is provided in the program at this point in time to cause a slight delay in the operation of MC 110 before the program causes the processor to look for an end of conversion (EOC) signal. MC 110 can outrun the time performance of ADC 65. With PGDLY, time is provided for ADC to become active and make the A/D conversion and prevent MC 110 from taking an erroneous reading of PA data.

ADC 65 then commences the sampling of the selected input and converts the analog data received from the selected sensor circuit 39 into an eight bit byte representation. During this time, MC 110 functioning is delayed, as previously mentioned, and then commences testing of the input line 94 for an EOC signal from ADC 65 via bus 66A, which is indicated at 232 in FIG. 5B.

When EOC is true, the sampling is complete, and MC 110 reads in the eight bit PA data which is brought into MC 110 via buffer 106, bus 66B, buffer 120, Port A of EPROM 116 and low address/data bus 112. This function is designated as READ PA DATA at 236 in FIG. 5B.

During the testing for EOC at 232, testing is also made to determine that toner enable, TENBL, at 234 is still true. If TENBL is not true, the sampling being conducted by ADC 65 is not valid since the fountain assembly is no longer in operation. At this point, the program would revert via line 235 to the beginning point of the program, BEGIN 204.

With both EOC 232 and TENBL 234 true and READ PA DATA 236 completed by MC 110, a comparison at 238 is made by MC 110 to determine if the PA data sample just received is greater by a predetermined amount as compared to an immediately previous processed and read PA data sample. For the particular program here, the differential amount, $\Delta$, must be greater than 5%. If the difference, $\Delta$, is greater than 5%, the sample will be determined as not a good or valid reading. A "not valid" or rejected reading, i.e. a reading indicative of a percentage change greater than 5%, causes the program to enter a return loop termed the "bubble reject" loop 243. A percentage change greater than 5% or other predetermined value is a likely indication of a sudden change in transmissivity at flow cell 40 due to the passage of an air bubble through the cell. In order to "track" the change, the sampling rate is increased, e.g. 50 ms per sample, which is represented by the 50 ms DELAY 240. Also, the add counter in MC 110 requiring four consecutive valid samples is reloaded to its full count as indicated at 242.

At this point in time, the program reverts back to return line 223 and a check for AUTO/MAN mode at 224 is again intiated. The program is repeated to decision making $\Delta > 5\%$ at 238. If the percentage difference, $\Delta$, remains still greater than 5% as compared to the previous sample, program operation remains in the "bubble reject" loop 243. When the difference, $\Delta$, of the instantaneous measured sample compared to a previously obtained sample is determined to be less than 5%, then a valid sample will be declared and the program will continue forward. However, if any sample is determined again to be 5% greater in transmissivity compared to a previously obtained sample, the program will revert again to the "bubble reject" loop 243 and the higher 50 ms rate of sampling will again commence.

Mention has been made above of a higher sampling rate of 50 ms via "bubble reject" loop 243. A lower sampling rate of one second is present when consecutively valid samples are being determined as will be evident below in the explanation of return loops 247 and 253, and the presence of 1 SEC DELAY 248.

If a valid reading has been determined between two consecutive sample comparisons, the next program function is another decision making function designated at 244 and is a determination as to whether the PA value of a determined valid sample is greater than its SW value obtained by MC 110 from DIP switch 136, i.e., is PA>SW? If the PA value is not larger than the SW value, then the valid sample is considered not a candidate for concentrate add (CONC ADD), since the level of transmissivity of the sample has not reached a level of transmissivity (i.e. the actual SW value) determinative that a toner concentrate addition should be considered for system 12. The course taken by the program at this point is the toner level adequate loop 247 if the PA value is less than the SW value. The valid sample is, therefore, passed by, indicative that all is well with the toner concentrate level in the fluid carrier. With this condition, the maximum add counter in MC 110 is reloaded, as indicated at 246 in loop 247, to its maximum value of six, if not already decremented by at least one. The sampling rate is established at one second by 1 SEC DELAY 248 and the program returns to line 223 and begins again with AUTO 224.

Assuming that no sudden changes greater than 5% in transmissivity at flow cell 40 occur, the sampling will continue at one second intervals via loop 247 as long as the PA value of the samples do not exceed the SW value. When a sample PA value comparison indicates that the PA value has exceeded the SW value, the program proceeds further with the decrement of the count value in the add counter by one, which is indicated at 250 by DEC 28H. The next function is a decision making function to determine whether the add counter decremented count is equal to zero, indicated at 252. If the add counter decremented count is not yet equal to zero, the program reverts to the "four valid requests" loop 253. As in the case of the toner level adequate loop 247, the one second sample rate is maintained via 1 SEC DELAY 248 and the program is returned to line 223 to begin again at AUTO 224.

It can be seen that if four consecutive samples are determined by MC 110 to be within less than 5% of one another and are each above the SW value, the add counter will be decremented to zero. Thus, four such valid samples under these two set conditions is determined as valid request for adding toner concentrate 14 to the toner development system 12. The program at this point will continue forward as set forth in FIG. 5C.

After four valid samples have now been determined, the add counter is reload with the value of four as indicated at 254. Then, a decision making determination at 256 is made as to whether six or more toner concentrate adds have been accomplished during the time that TENBL has been true, i.e., does the maximum add counter equal zero? If this determination reveals six consecutive concentrate adds during the course of TENBL being true, then no more toner concentrate add will be permitted and the program will revert to line 223 and continue operating through the program and proceed around loop 257, designated in FIG. 5C as the "no more toner concentrate allowed" loop. Program operation will continue in loop 257 until reversion to MANUAL mode at 224 is accomplished or TENBL becomes not true at 234, i.e., operation of the selected toner development system 12 ceases.

The maximum add count of six is a preselected determination representative of an unusual situation wherein too many concentrate adds have occurred in a single run, i.e., during a single TENBL, indicative that a malfunction has occurred, e.g., the toner concentrate bottle 28 may be depleted or control relay 32 or other circuit component may be malfunctioning. Experience has determined that normally only about three or four toner concentrate adds (CONC ADD) are normally necessary during the longest period of use of a single enabled toner development system 12. Thus, more than six CONC ADD entries is indicative that something else may be wrong with the toner development system.

If a determination is made that the maximum add counter has not been decremented to zero, then all conditions have been met for a toner concentrate add as indicated at 258. The signal, CONC ADD, is accomplished by setting the value of CONC ADD at MC 110 Port 1, pin 3 true or high for a predetermined period of time, e.g. two seconds. The single CONC ADD is provided to SC 75 via bus 72 which, in turn, initiates operation of control relay 32 via 74 and toner concentrate solenoid value 30 for a period of two seconds. The time length of operation of signal CONC ADD may be varied as desired by reset of a register value in MC 110.

After the completion of CONC ADD 258, the maximum add counter is decremented by one, as indicated at 260. Then a final decision determination at 262 is made as to whether the value of the maximum add counter has reached zero. If this counter has not been reduced to a value equal to zero, then a toner concentrate condition of CONC OK 264 (toner concentrate is OK) is indicated at MC 110 Port 1, pin 4 of MC 110 by setting its output to not true or low. If the decrement of the maximum add counter has reached the value of zero, then a toner concentrate condition of CONC OUT 266 (toner concentrate is depleted) is indicated at MC 110 Port 1, pin 4 by setting its output to true or high. This will cause a display indicator to be set at the control panel of the machine via SC 75 to indicate that the toner concentrate 14 has been depleted in the particular activated toner development system 12.

As indicated previously, if the CONC OUT condition 266 has been reached, the program will continue to function via the "no more toner concentrate allowed" loop 257 as long as the program is maintained in AUTO mode and the selected toner development system 12 remains enabled (TENBL remains true). In the meantime, the machine display will continue to be activated indicating the CONC OUT condition.

The portion of the program beyond loop 257 and involving a CONC ADD 258, CONC OK condition 264 or CONC OUT condition 266 is also provided with a five second delay, at 5 SEC DELAY 268 before the program reverts back to line 223 to begin the sampling operation over again, if AUTO & TENBL continue to be true. This five second delay permits sufficient time for thorough mixing of the added toner concentrate 14 in fluid carrier 16.

In brief summary, program operation of MC 110 is (1) determine if a sample obtained is valid sample or not a valid sample and therefore rejected, (2) increase the sampling rate if a sample has been determined not a valid sample until a valid sample is determined, (3) determine if the sample is greater than its predetermined threshold, i.e., PA>SW, if it is a valid sample, (4) determine if four consecutive valid samples have occurred to thereby enable the addition of toner concentrate to the enabled toner development system, (5) permit the continuing of valid sample determination up to six consecutive adds of toner concentrate determined in packets of four consecutive valid samples above the SW threshold value, (6) cut off the ability of adding any more toner concentrate after six consecutive toner concentrate adds have been accomplished, and (7) provide an indication that toner concentrate for the selected toner development system must be depleted or some other system malfunction must be occurring if six consecutive toner concentrate adds have been accomplished during the enablement of a toner development system. During any of this program operation, if a sample is determined to be not valid, the sampling process is performed at a faster sampling rate until a valid sample is again determined and any previously accumulated count up to that time toward determining a packet of four consecutive valid samples above the SW threshold value is disregarded and the add counter is reloaded to its maximum value of four.

Figure 6:
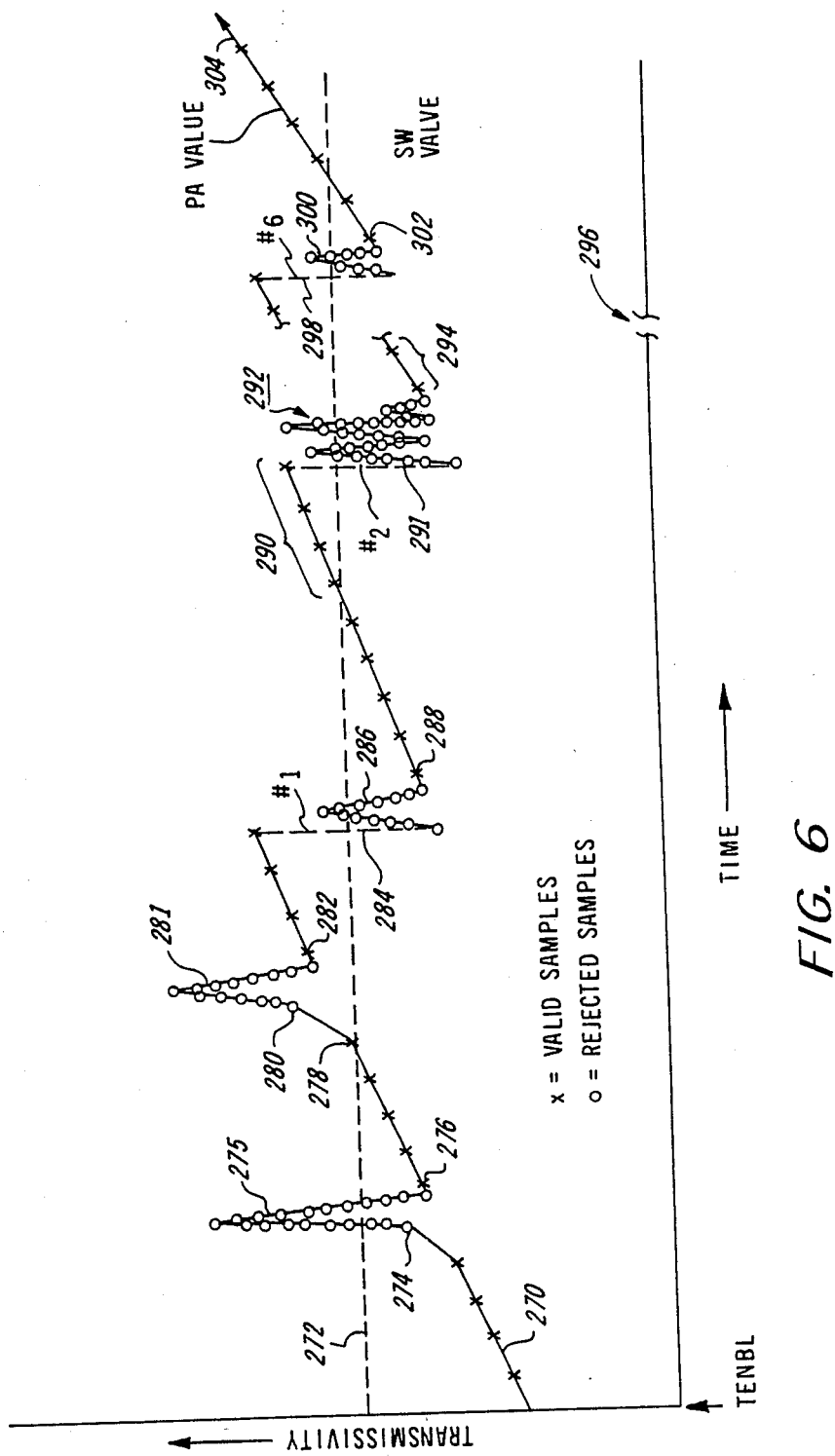
FIG. 6 is a graphic illustration of an example of the transmissivity determination carried out by the system of this invention.

FIG. 6 provides a graphic illustration of an example of the program operation of MC 110 just explained. Line 270 represents the periodic sampling time of the eight bit PA value determined by ADC 65 and processed at MC 110 to determine whether each sample is a valid or not valid and, therefore, rejected. Line 272 represents the predetermined SW value. In FIG. 6, valid samples are indicated by an "x" and rejected samples are indicated by an "o". To be noted is that time period between consecutive "x" or valid samples is longer compared to "o" or rejected samples, the former being representative of the one second sampling period and the latter representative of the faster 50 ms sampling period.

Starting at the beginning of PA value line 270, it is seen that four consecutive one second valid samples have been determined, i.e., the comparison with a previous sample in each case has determined that a percentage difference, Δ, has been less than 5%. However, the PA value in each case is below the SW value represented by line 272. Therefore, the action taken at PA>SW 244 has been not true and the program has reverted to the "toner level adequate" loop 247.

After the fourth valid sample, however, there is a sudden change in transmissivity as indicated at 274. The change in transmissivity has exceeded 5%. At this point, the rate of sampling is advanced to 50 ms per the "bubble reject" loop 243. From this point on, 50 ms sampling is continued until a 50 ms sample at 276 indicates that the transmissivitly difference, Δ, is less than 5% at which time, the sample at 276 is declared valid and the sampling returns to the one second sampling rate via the "four valid requests" loop 253. The series of rapid change in transmissivity represented by peak 275 of the series of not valid samples is indicative of the passage of an air bubble through flow cell 40.

Figure 5B:
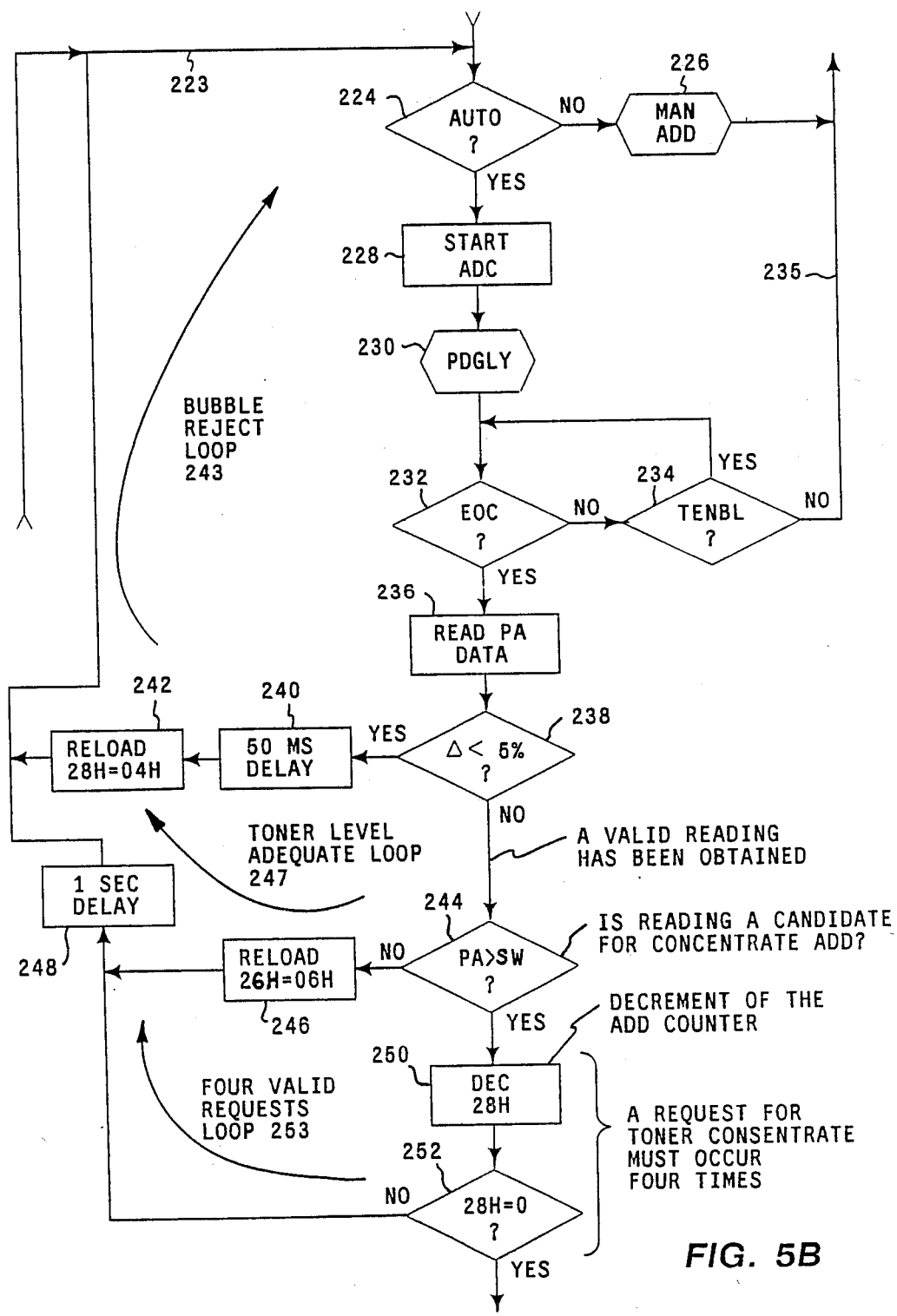
Figure 5C:
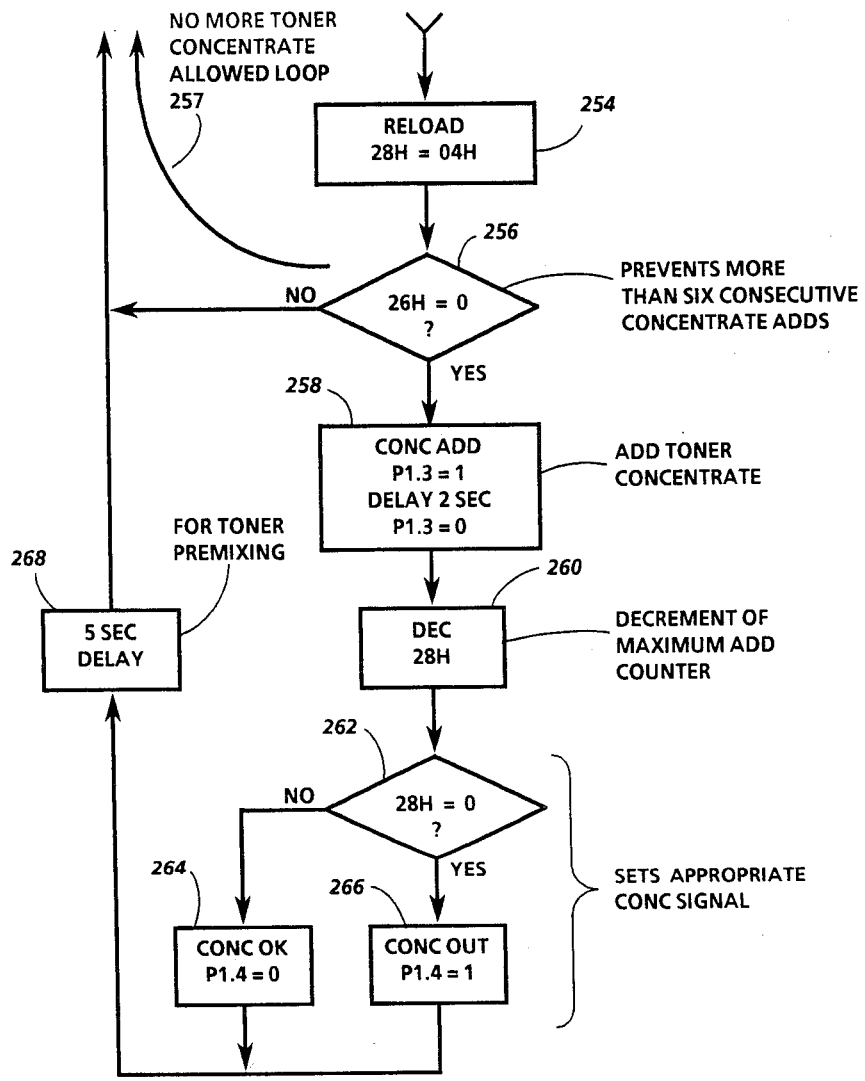

Continuing along the PA value line 270 in FIG. 6, the add counter has been reloaded with the value of four (242 in FIG. 5B). The next four consecutive samples are determined valid samples, as the change in transmissivity in each case is less than 5%. However, the sampled PA values have not reached the SW value so that the program has proceeded through the "toner level adequate" loop 247. The next fifth consecutive valid sample 278 has just exceeded the SW value so that a decrement of the add counter will occur and the program will proceed through the "four valid requests" loop 253. At this point three more valid samples above the SW value must be received before a CONC ADD will occur. However, a sudden change in transmissivity occurs at the next sample 280 sufficient to be indicative of a rejected sample due to a transmissivity change greater than 5%. The program again reverts to the "bubble reject" loop 243 initiating a 50 ms sampling rate and continuous reload of the add counter to a value of four.

After several 50 ms samples having comparative differences of greater than 5% as indicated by peak 281, a valid 50 ms sample is ascertained at 282 due to the fact that the change in transmissivity compared to the immediately previous 50 ms sample is less than 5% change. At this point in time, the program reverts back again to operation through the "four valid requests" loop 253 since the valid samples determined at this point on are PA>SW in each case.

The next four samples starting with sample 282 are all valid samples and all above the SW value 272. Program operation has progressed, via loop 253, decrementing add counter at 250 to zero. At this point, the program reload of add counter to a value of four occurs (254 in FIG. 5C) and a CONC ADD 258 occurs followed by a five second delay period to permit toner premixing with the added concentrate. This period of time is indicated at 5 SEC DELAY 268 in FIG. 5C. The five second delay is denoted in FIG. 6 by dotted line 284. Also, this represents the first CONC ADD since TENBL, and the maximum add counter is decremented at 260 by one. At the end of this period of time, sampling is resumed by MC 110 with continued sample preparation performed by ADC 65.

After five seconds of sample delay, sampling begins again with an immediate confrontation of a rapid change in transmissivitly indicating the passage of an air bubble through flow cell 40. This is represented in FIG. 5B by the rapid sampling via "bubble reject" loop 243 and in FIG. 6 by peak 286. 50 ms sampling is initiated until 50 ms sample 288 which provides an indication that the percentage change in transmissivity relative to the last 50 ms sample is less than 5% thereby indicating that the samples are again valid.

In the example of FIG. 6, the sampling remains valid at this point and extends through the SW value 272 for four consecutive samples 290 above that value. This determination is made through program operation via the "four valid requests" loop 253. After a packet of four valid samples 290 has occurred, all above the SW value 272, a second CONC ADD occurs and the maximum add counter is decremented again by one.

At this point in time in FIG. 6, a five second delay occurs again to permit mixing of the toner concentrate, which delay is represented by line 291. Sampling begins again with an immediate indication of a series of bubbles passing through flow cell 40. This series of bubbles is represented by the group of transmissivity peaks 292 monitored at the 50 ms rate via loop 243. After passage of the peaks 292, stabilization is reached and valid sampling again is achieved but below the SW value 272, as indicated at 294.

It should be noted that the passage of large bubbles may not provide the transmissivity peaks denoted in FIG. 6. Rather, the peaks may have a extended flat top portions where valid sampling is again acheived. However, it is not likely that four consecutive valid samples will occur before there is another change in transmissivity that is greater than 5%, regardless of whether such sampling is occurring above or below the SW line 272, such another change indicating the withdraw of the bubble from the confines of the flow cell 40.

FIG. 6 shows a break at 296 wherein it is to be assumed that CONC ADD conditions have occurred three additional times. At this point, FIG. 6 continues to a six consecutive CONC ADD indicated by dotted line 298. After completion of this sixth CONC ADD of two seconds, the maximum add counter has been decremented to zero (26H=0 at 262 is true) so that a CONC OUT condition 266 exists. As a result, a display indication will be given at the machine control panel that the toner concentrate has been depleted. At the same time, sampling will continue as before, as indicated in FIG. 6. Sampling begins again with an immediate indication of a bubble passing through flow cell 40 resulting in the faster sampling rate via loop 243 as indicated by peak 300. Soon, a valid sample is determined at sample 302 and the program will revert to "toner level adequate" loop 247. Later, the toner concentrate sample PA values are determined to be above the SW value 272 but since the maximum add counter value of six has already been decremented to zero at 260 in FIG. 5C, the program at decision determination, 26H=0 at 256, will revert to the "no more toner concentrate allowed" load 257, preventing the occurrence of any more CONC ADD at 258. As a result, the sample PA value 270 will continue beyond four consecutive valid samples as indicated at 304 in FIG. 6.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. A method for monitoring and maintaining a predetermined concentration of material carried in a fluid medium wherein a portion of the fluid medium is passed through flow cell means for the purpose of examining its transmissivity and comprising the steps of
   establishing a predetermined concentration threshold desired for the concentration of material in the fluid medium,
   measuring the transmissivity of the fluid medium passing through the flow cell means creating a transmissivity sample,
   determining any disparity between the measured transmissivity sample with a previously measured transmissivity sample,
   continuing the steps of measuring and disparity determining at a given sampling rate if the determined disparity is less than a predetermined value, said disparity being below said predetermined value being indicative of a valid sample,
   counting the number of consecutive valid samples so measured and disparity determined if each such sample is above said concentration threshold, and
   adding additional material to the fluid medium after the count of valid samples has reached a given number of valid samples above said concentration threshold.

2. The method of claim 1 which includes the step of
   changing the sampling rate if the disparity determination between a measured transmissivity sample with a previously measured transmissivity sample is greater than said predetermined value and discontinuing valid sample determination and counting, and
   returning to the original sampling rate if the disparity determination between a measured transmissivity sample with a previously measured transmissivity sample is again less than said predetermined value.

3. The method of claim 2 wherein the change in said sampling rate is an increase in the sampling rate.

4. In a system for monitoring and maintaining a predetermined concentration of a material carried in a fluid medium comprising
   flow cell means,
   means for feeding the fluid medium through said flow cell means,
   means for establishing a predetermined concentration threshold desired for the concentration of said material in the fluid medium, means for measuring the transmissivity of the material carried in the fluid medium passing through the flow cell means to create a transmissivity sample, means to determine any disparity between the measured transmissivity sample with a previously measured transmissivity sample comprising means to render said samples valid if said determined disparity is less than a predetermined value, means to count said valid samples if each such consecutive sample is above said concentration threshold, and means to add said material to the fluid medium after said count has reached a given number.

5. In the system of claim 4 wherein said determining means further comprises
means to render said samples not valid and rejected if said determined disparity is greater than a predetermined value.

6. In the system of claim 5 which further comprises means to reset said count means.

7. In the system of claim 5 which further comprises means to render said samples valid if said determined disparity is again less than said predetermined value and again count said valid samples.

8. In the system of claim 7 which furthr comprises means to decrease the sampling rate from a second rate to a first rate when said samples are valid.

9. In the system of claim 4 which further comprises means to disregard said valid samples if any such consecutive sample is below said concentration threshold.

10. In the system of claim 9 which further comprises means to reset said count means.

11. In the system of claim 5 which further comprises means to increase the sampling rate from a first rate to a second rate when said samples are not valid.

12. In a system for monitoring and maintaining a predetermined concentration of a material carried in a fluid medium comprising means for measuring at a first sampling rate the transmissivity of said material carried in said fluid medium, means to determine the amount of any disparity between the measured transmissivity of a presently measured sample and a previously measured sample, means to increase the first sampling rate to a second sampling rate when said disparity is greater than a predetermined amount, means to count a plurality of consecutively measured samples if said disparity therebetween is less than said predetermined amount and the measured transmissivity of each of said consecutively measured samples are below a predetermined concentration threshold, and means to add said material to said fluid medium when a predetermined number of said consecutively measured samples have been accumulated.

13. A method of monitoring and maintaining a predeterined concentration of a material carried in a fluid medium comprising the steps of
establishing concentration threshold desired for the concentration of material in the fluid medium, measuring the transmissivity of the material carried in the fluid medium at a first sampling rate producing a series of samples, determining the amount of disparity between the measure transmissivity of a presently measured sample and a previously measured sample, increasing sampling from the first sampling rate to a second sampling rate if the disparity is greater than a predetermined amount, accumulating a count of measured samples if (a) the disparity between consecutively measured samples is less than the predetermined amount and (b) the measured transmissivity of each of said consecutively measured sample is below a predetermined concentration threshold, and adding material to the fluid medium when a predetermined number of said consecutively measured sample have been accumulated.

* * * * *